(12) United States Patent
Ueda et al.

(10) Patent No.: US 7,797,807 B2
(45) Date of Patent: Sep. 21, 2010

(54) DOUBLE-LAYER VACUUM CONTAINER

(75) Inventors: Hitoshi Ueda, Nara (JP); Shigetaka Yoshikawa, Nishikamo-gun (JP); Hideo Kobayashi, Mishima (JP); Yoshikazu Shinpo, Nisshin (JP); Mamoru Suzuki, Chiryu (JP); Isao Goto, Toyota (JP); Masaaki Iinuma, Nishikamo-gun (JP); Toshio Morikawa, Toyota (JP); Shigeo Ito, Anjyo (JP); Yoshio Miyata, Nagoya (JP)

(73) Assignees: Tiger Corporation, Osaka (JP); Toyota Jidosha Kabushiki Kaisha, Aichi (JP); Denso Corporation, Aichi (JP)

( * ) Notice: Subject to any disclaimer, the term of this patent is extended or adjusted under 35 U.S.C. 154(b) by 477 days.

(21) Appl. No.: 11/903,980

(22) Filed: Sep. 25, 2007

(65) Prior Publication Data
US 2009/0114335 A1 May 7, 2009

Related U.S. Application Data

(63) Continuation of application No. 10/700,850, filed on Nov. 4, 2003, now Pat. No. 7,284,674.

(30) Foreign Application Priority Data
Nov. 6, 2002 (JP) .............................. 2002-322842

(51) Int. Cl.
*B21D 39/00* (2006.01)
*A47J 41/00* (2006.01)
(52) U.S. Cl. .................. 29/455.1; 29/458; 29/422; 220/592.27; 220/592.22; 220/592.2; 220/592.16; 220/592.17

(58) Field of Classification Search ............... 29/455.1, 29/458, 422, 773, 778, 801; 220/592.27, 220/592.22, 592.2, 592.16, 592.17, 592.01, 220/23.89
See application file for complete search history.

(56) References Cited

U.S. PATENT DOCUMENTS

| | | | | |
|---|---|---|---|---|
| 889,992 | A | * | 6/1908 | Van Wye .................... 215/12.2 |
| 2,065,293 | A | | 9/1935 | Scudder |
| 2,363,365 | A | * | 11/1944 | Schmitt ....................... 392/333 |
| 3,207,354 | A | | 9/1965 | Skinner et al. |
| 3,217,920 | A | | 11/1965 | Holben |

(Continued)

FOREIGN PATENT DOCUMENTS

JP 05237038 A * 9/1993

(Continued)

*Primary Examiner*—Essama Omgba
(74) *Attorney, Agent, or Firm*—Jordan and Hamburg LLP

(57) ABSTRACT

A double-layer vacuum container includes: an inner container having a bridging member supported by an outer container in a bridging manner; the outer container through which the bridging member extending from the inner container is externally exposed; and a cover member for externally covering the portion of the outer container through which the bridging member is exposed and for sealing a space inside the cover member and a space between the inner container and the outer container in a vacuum state between the cover member and the outer container. With such a structure of the double-layer vacuum container, the inner container other than a lip is supported by the outer container with a good heat retaining property to prevent the displacement or damage of the inner container.

5 Claims, 15 Drawing Sheets

U.S. PATENT DOCUMENTS

| | | | |
|---|---|---|---|
| 3,311,249 A * | 3/1967 | Bell | 215/12.1 |
| 3,355,051 A | 11/1967 | Edmond et al. | |
| 3,425,585 A | 2/1969 | Nichols | |
| 3,698,589 A | 10/1972 | Perry | |
| 3,785,544 A * | 1/1974 | Smith | 206/446 |
| 3,813,757 A * | 6/1974 | Bell | 29/455.1 |
| 3,905,508 A | 9/1975 | Hibl et al. | |
| 3,979,025 A | 9/1976 | Friedrich et al. | |
| 4,138,027 A * | 2/1979 | Frye et al. | 215/12.2 |
| 4,184,601 A * | 1/1980 | Stewart et al. | 215/13.1 |
| 4,318,056 A | 3/1982 | Sze | |
| 4,459,793 A | 7/1984 | Zenger | |
| 4,548,335 A | 10/1985 | Remes et al. | |
| 4,675,508 A * | 6/1987 | Miyaji et al. | 219/437 |
| 4,754,888 A * | 7/1988 | Letsch et al. | 215/12.1 |
| 4,877,153 A | 10/1989 | Varghese et al. | |
| 5,651,473 A | 7/1997 | Preston et al. | |
| 5,678,725 A * | 10/1997 | Yamada et al. | 220/592.21 |
| 5,931,334 A * | 8/1999 | Sartore | 220/592.16 |
| 6,105,799 A * | 8/2000 | Takagawa | 215/12.1 |
| 6,332,557 B1 * | 12/2001 | Moran | 220/592.16 |
| 7,284,674 B2 * | 10/2007 | Ueda et al. | 220/560.1 |
| 7,306,113 B2 * | 12/2007 | El-Saden et al. | 220/592.17 |
| 2009/0045194 A1 * | 2/2009 | Rhee | 220/23.89 |

FOREIGN PATENT DOCUMENTS

| | | | |
|---|---|---|---|
| JP | 06183466 A * | 7/1994 | |
| JP | 7-27430 | 5/1995 | |

* cited by examiner

DOUBLE-LAYER VACUUM CONTAINER

The present disclosure relates to subject matter contained in priority Japanese Patent Application No. 2002-322842, filed on Nov. 6, 2002, the contents of which is herein expressly incorporated by reference in its entirety.

BACKGROUND OF THE INVENTION

1. Field of the Invention

The present invention relates to a double-layer vacuum container including a vacuum space between an inner container and an outer container which constitute a metal double-layer container.

2. Description of the Related Art

Such a double-layer vacuum container is widely used in the following manner. The double-layer vacuum container stores various types of beverage such as green tea, coffee, black tea or an isotonic drink therein so as to keep the beverage warm or cold. The double-layer vacuum container also serves to pour a drink by means of a motor pump, a manual pump or inclination, to directly serve a drink through a spout, to serve a drink through a straw or the like in accordance with each use and intended purpose.

With reference to FIG. 1 illustrating an embodiment of the present invention, the double-layer vacuum container is constituted by a metal inner container 1 and a metal outer container 2. A lip 1a of the inner container 1 and a lip 2a of the outer container 2 are welded to each other so as to be integrally formed. Then, an exhaust port provided in a portion of the outer container 2 is sealed after the container is pumped to a vacuum through the exhaust port, thereby obtaining a vacuum space 3 between the inner container 1 and the outer container 2.

However, since the lip 1a is supported merely through bonding to the lip 2a of the outer container 2 although the inner container 1 stores a liquid to have significantly increased weight, the inner container 1 is likely to be affected by a shake or vibration. For example, an inertia force may be applied by rough handling of the container, shaking when the container is carried or the like, a sudden change in movement, a fall or the like, which may displace or damage the container. In particular, in accordance with the requirements of streamlining the shape of the double-layer vacuum container, a gap between the inner container 1 and the outer container 2 is set to an extremely small value. As a result, however, the inner container 1 and the outer container 2 are brought into contact with each other by the displacement to be likely to degrade its heat retaining property.

In order to overcome such a problem, a metal double-layer vacuum container, in which an inner container and an outer container are brought into point contact or line contact at a plurality of positions in a circumferential direction under the middle of their body portions, is known (for example, see Japanese Utility Model Laid-Open Publication No. Hei 7-27430). In this structure, in addition to a bonded portion at the lip between the inner container and the outer container, a part of the inner container under the middle of the body portion is also supported by the contact portions with the outer container at a plurality of positions in a circumferential direction. Therefore, shakes or displacement of the inner container can be prevented. Moreover, the degradation of a heat retaining property due to heat conduction from the inner container to the outer container can be restrained to a certain degree because the contact between the inner container and the outer container is achieved by point contact or line contact at a plurality of positions.

In the above-described conventional example, however, the supporting portion of the outer container under the middle of the body portion of the inner container directly conducts heat to an externally exposed portion of the outer container or has a short thermal conduction path to the externally exposed portion of the outer container. Therefore, a sufficient heat retaining property has not been obtained.

SUMMARY OF THE INVENTION

In view of the above problems, the present invention has an object of providing a double-layer vacuum container, in which an inner container other than a lip is supported by an outer container with a good heat retaining property so as to prevent any displacement or damages.

In order to achieve the above object, the double-layer vacuum container of the present invention includes a vacuum space between an inner container and an outer container constituting a metal double-layer container. The double-layer vacuum container includes: the inner container having a bridging member extending to the outer container in a bridging manner so as to be supported thereby; the outer container supporting the bridging member extending from the inner container while the bridging member being externally exposed; and a cover member for externally covering a portion of the outer container through which the bridging member is exposed and for sealing a space inside the cover member and a space between the inner container and the outer container in a vacuum state, between the cover member and the outer container.

In such a structure, the inner container is supported by the outer container through the bridging member which extends from the inner container so as to be exposed through the outer container while a space including the exposed portion of the bridging member through the outer container is being covered with the cover member. In addition, the portion of the outer container through which the bridging member exposed is enclosed within the vacuum space inside the cover member, which is simultaneously formed with the attachment of the cover member while sealing the space between the inner container and the outer container in a vacuum state. As a result, heat is prevented from being radiated by the outer container from the inner container through the bridging member and the supporting portion to the exterior without needing any special means. At the same time, a length of a heat conduction path from the inner container through the bridging member to the portion where the outer container is externally exposed is increased. Since heat radiation due to heat conduction from the inner container through the bridging member via the supporting structure achieved by the outer container to the exterior can be restrained in accordance with the degree of increase in length of the heat conduction path, the inner container other than its lip is supported by the outer container with a good heat retaining property to prevent any displacement or damages.

In another structure where the outer container supports the bridging member around its axis by a supporting member provided inside the cover member while the bridging member has a play with the outer container about its axis, a length of the heat conduction path in the vacuum space from the bridging member to the outer container, therefore, the heat conduction path to the portion where the outer container is externally exposed, is increased as compared with that of the heat conduction path through which heat is directly conducted from the bridging member to the outer container. Therefore, heat retaining performance is further enhanced in accordance with the degree of increase in length of the heat conduction path. In addition, a fitting position error of the inner container with respect to the outer container or an attachment position error of the bridging member with respect to the inner container is posteriorly absorbed by the play and by adjusting the attachment position of the supporting member with respect to the outer container. Therefore, a drop in yield due to a positional error as described above is prevented.

In a further structure where the inner container and the outer container are bonded at their lips and the bridging member extends from the bottom of the inner container so as to be exposed through the bottom of the outer container to be supported thereby, the inner container is supported by the outer container through the bridging member which extends from the bottom of the inner container so as to be exposed through the bottom of the outer container. In addition, a vacuum space is formed by and covered with the cover member to include the portion where the bridging member is exposed through the outer face of the outer container so as to prevent heat from being radiated by the outer container from the inner container through the bridging member to the exterior. At the same time, a length of the heat conduction path to the portion where the outer container is externally exposed is increased. Since the heat radiation due to heat conduction from the inner container through the bridging member via the supporting structure achieved by the outer container to the exterior can be restrained in accordance with the degree of increase in length of the heat conduction path, the inner container other than its lip is supported by the outer container with a good heat retaining property to prevent any displacement or damages.

In a further structure where a heat conduction inhibition hole is provided in the middle of the heat conduction path of a member constituting the heat conduction path from the inner container to the portion where the outer container is externally exposed, the heat conduction inhibition hole provided in the member constituting the heat conduction path reduces a width of a part of the heat conduction path so as to inhibit the heat conduction ahead of them although the heat may otherwise be conducted from the inner container to the portion where the outer container is externally exposed. Therefore, a heat retaining property is further improved.

In a further structure where the bridging member is supported by three or more convex portions of the support member formed by plate working on a cylindrical wall, on which the bridging member is fitted into the supporting member, in a circumferential direction, the convex portions formed by sheet metal working stably support the bridging member at three or more positions in a circumferential direction even with a small contact area such as through point contact or line contact while remarkably restraining the heat conduction between the bridging member and the supporting member to further improve heat retaining performance. In addition, as the degree of curvature of the convex portion is reduced, the support demonstrates higher buffering or vibration-absorbing effects owing to the elastic force. Therefore, the durability of the inner container becomes further increased.

In a further structure where the support member is fixed to the outer face of the outer container with a plurality of leg portions formed in a circumferential direction, the bearing power of the outer container through the supporting member for the inner container is transmitted in an approximately uniformly distributed manner through the plurality of leg portions so as to stably support the inner container. At the same time, since the buffering or vibration-absorbing effects owing to the elastic force can be demonstrated between the attachment portion to the outer container through the plurality of leg portions and the bridging member, the durability of the inner container becomes further improved.

In a further structure where the bridging member is fitted into the supporting member in a screw structure for supporting the bridging member, the inner container becomes firmly supported while being pulled toward the outer container without causing any displacement of the axis. Therefore, the inner container becomes more easily prevented from being displaced or damaged, thereby further improving the durability.

Moreover, another double-layer vacuum container according to the present invention includes: a double-layer container formed by combination of a metal inner container and a metal outer container so as to have a vacuum space therebetween; a bridging member extending from the inner container to the outer container in a bridging manner so as to be externally exposed through the outer container to be supported by the outer container; and a cover member for externally covering a portion of the outer container through which the bridging member is exposed and for sealing a space inside the cover member and a space between the inner container and the outer container in a vacuum state between the cover member and the outer container.

In such a structure, the inner container is supported by the outer container through the bridging member extending from the inner container so as to be exposed through the outer container. A space including the portion of the outer container through which the bridging member is exposed is covered with the cover member. In addition, the portion of the outer container, through which the bridging member is exposed, is enclosed within the vacuum space inside the cover member, which is simultaneously formed with the attachment of the cover member while sealing the space between the inner container and the outer container in a vacuum state. As a result, heat radiation by the outer container from the inner container through the bridging member is prevented. At the same time, a length of the heat conduction path to the portion where the outer container is externally exposed is increased. Since the heat radiation due to heat conduction from the inner container through the bridging member via the supporting structure achieved by the outer container to the exterior can be restrained in accordance with the degree of increase in length of the heat conduction path, the inner container other than its lip is supported by the outer container with a good heat retaining property to prevent any displacement or damages.

Furthermore, a further double-layer vacuum container according to the present invention includes a vacuum space between an inner container and an outer container constituting a metal double-layer container. The double-layer vacuum container includes: the inner container having a bridging member extending to the outer container in a bridging manner so as to be supported thereby; the outer container supporting the bridging member extending from the inner container through a vibration-absorbing portion while the bridging member being externally exposed; and a cover member for externally covering a portion of the outer container through which the bridging member is exposed and for sealing a space inside the cover member and a space between the inner container and the outer container in a vacuum state, between the cover member and the outer container.

In such a structure, the inner container is supported by the outer container through the bridging member which extends from the inner container to be exposed through the outer container. The vacuum space is formed by the cover member and is covered with the cover member so as to include the portion of the outer container through which the bridging member is exposed so that heat is prevented from being radiated by the outer container from the inner container to the bridging member. At the same time, a length of the heat conduction path to the portion where the outer container is externally exposed is increased. Since the heat radiation due to heat conduction from the inner container through the bridging member via the supporting structure achieved by the outer container to the exterior can be restrained in accordance with the degree of increase in length of the heat conduction path, the inner container other than its lip is supported by the outer container with a good heat retaining property to prevent any displacement or damages.

Furthermore, a yet further double-layer vacuum container according to the present invention includes a vacuum space between an inner container and an outer container constituting a metal double-layer container. The double-layer vacuum container includes: the inner container having a bridging member extending to the outer container in a bridging manner so as to be supported thereby; the outer container supporting the bridging member extending from the inner container through a vibration-absorbing portion while the bridging member being externally exposed; and a cover member for externally covering a portion of the outer container through which the bridging member is exposed, a space inside the cover member being a vacuum space.

In such a structure, the inner container is supported by the outer container through the bridging member which extends from the inner container so as to be exposed through the outer container. The vacuum space is formed by and covered with the cover member so as to include the portion of the outer container through which the bridging member is exposed in such a manner that heat is prevented from being radiated by the outer container from the inner container through the bridging member. At the same time, a length of the heat conduction path to the portion where the outer container is externally exposed is increased. Since the heat radiation due to heat conduction from the inner container through the bridging member via the supporting structure achieved by the outer container to the exterior can be restrained in accordance with the degree of increase in length of the heat conduction path, the inner container other than its lip is supported by the outer container with a good heat retaining property to prevent any displacement or damages. In particular, since the bridging member is supported by the outer container through the vibration-absorbing portion demonstrating the buffering and vibration-absorbing effects, an impact applied through the outer container or the vibration caused thereby is alleviated or damped. Therefore, the inner container becomes easily prevented from being damaged in accordance with the buffering and vibration-absorbing effects, thereby improving the durability.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 3A is a sectional view and FIG. 3B is a transverse sectional view;

DESCRIPTION OF THE PREFERRED EMBODIMENTS

Hereinafter, an embodiment of the present invention will be described with some examples with reference to FIGS. 1 to 15 for understanding of the present invention.

Figure 1:
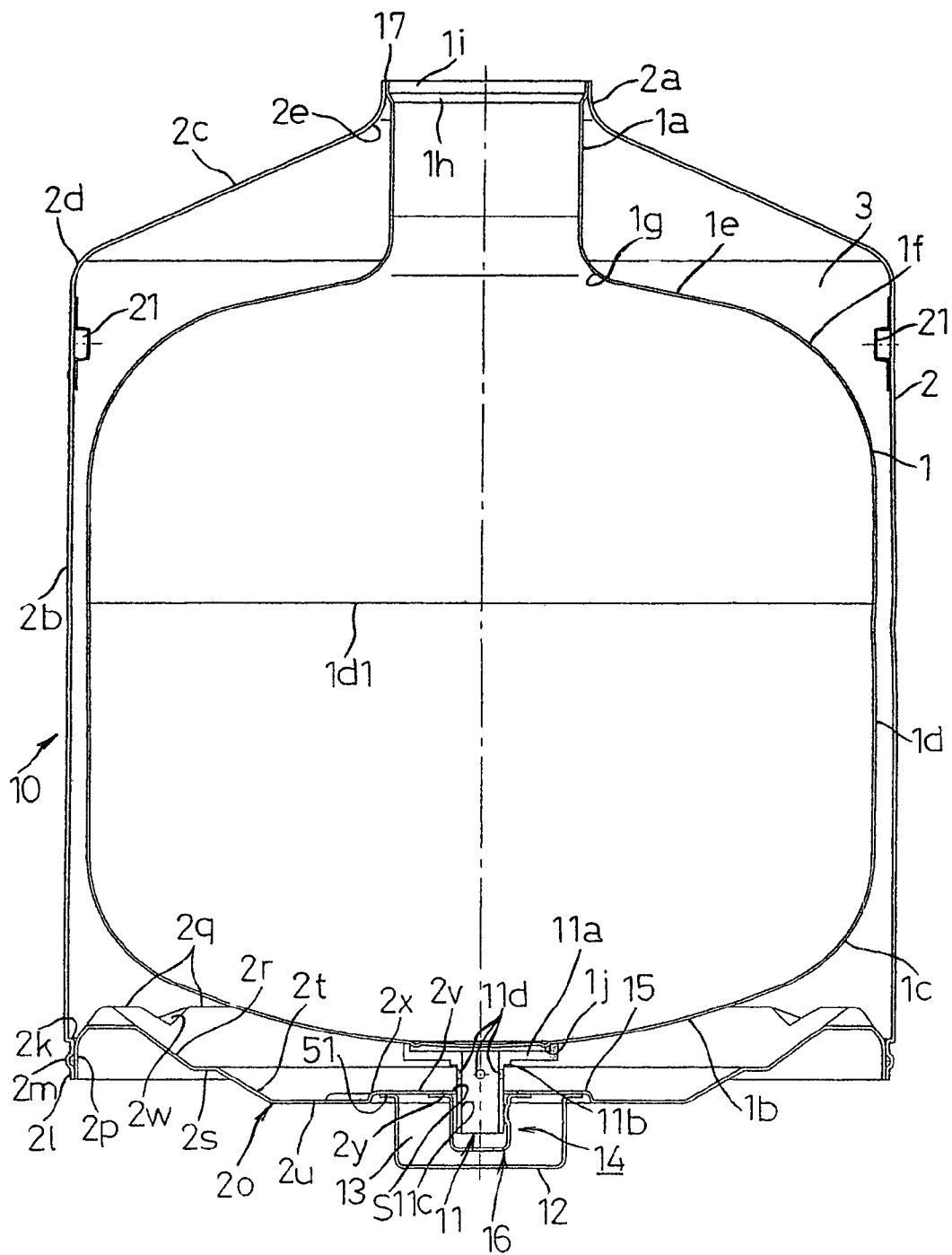
FIG. 1 is a sectional view showing an example of a double-layer vacuum container according to an embodiment of the present invention.
Figure 7:
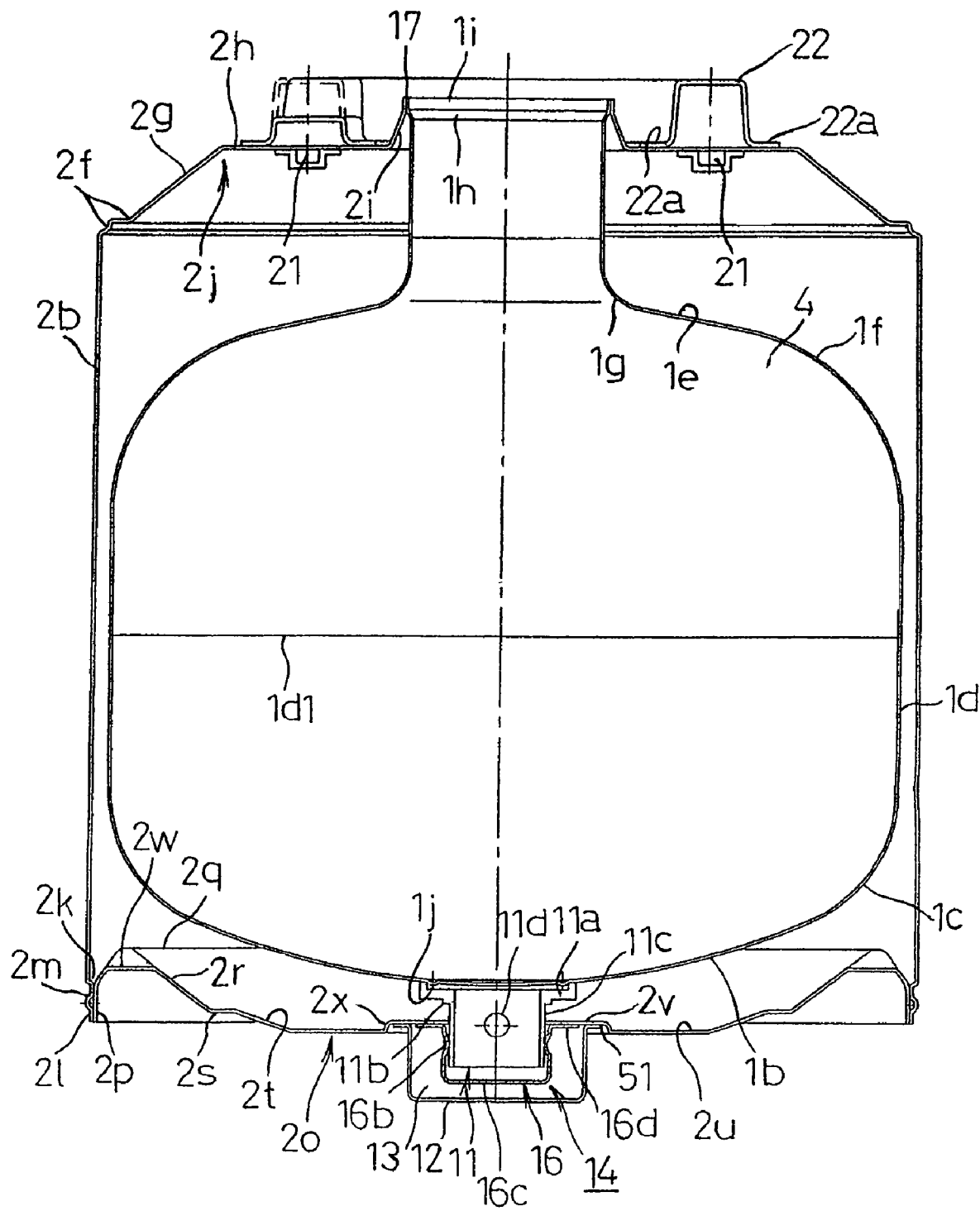
FIG. 7 is a sectional view showing a further example of the double-layer vacuum container according to the embodiment of the present invention.

A double-layer vacuum container of an example shown in FIG. 1 and another double-layer vacuum container of an example shown in FIG. 7 according to this embodiment are used for beverage, each including a vacuum space 3 between a metal inner container 1 and a metal outer container 2, by way of example. Stainless steel having low heat conductance is used for the inner container 1 and the outer container 2 because the double-layer vacuum container is formed as a thermal insulation container for keeping a stored beverage warm or cool and also in view of strength and anti-corrosion. However, a material of the inner container 1 and the outer container 2 is not limited thereto. Any other materials such as a metal or a synthetic resin can be selected for use in accordance with intended use and the conditions of use.

Figure 4:
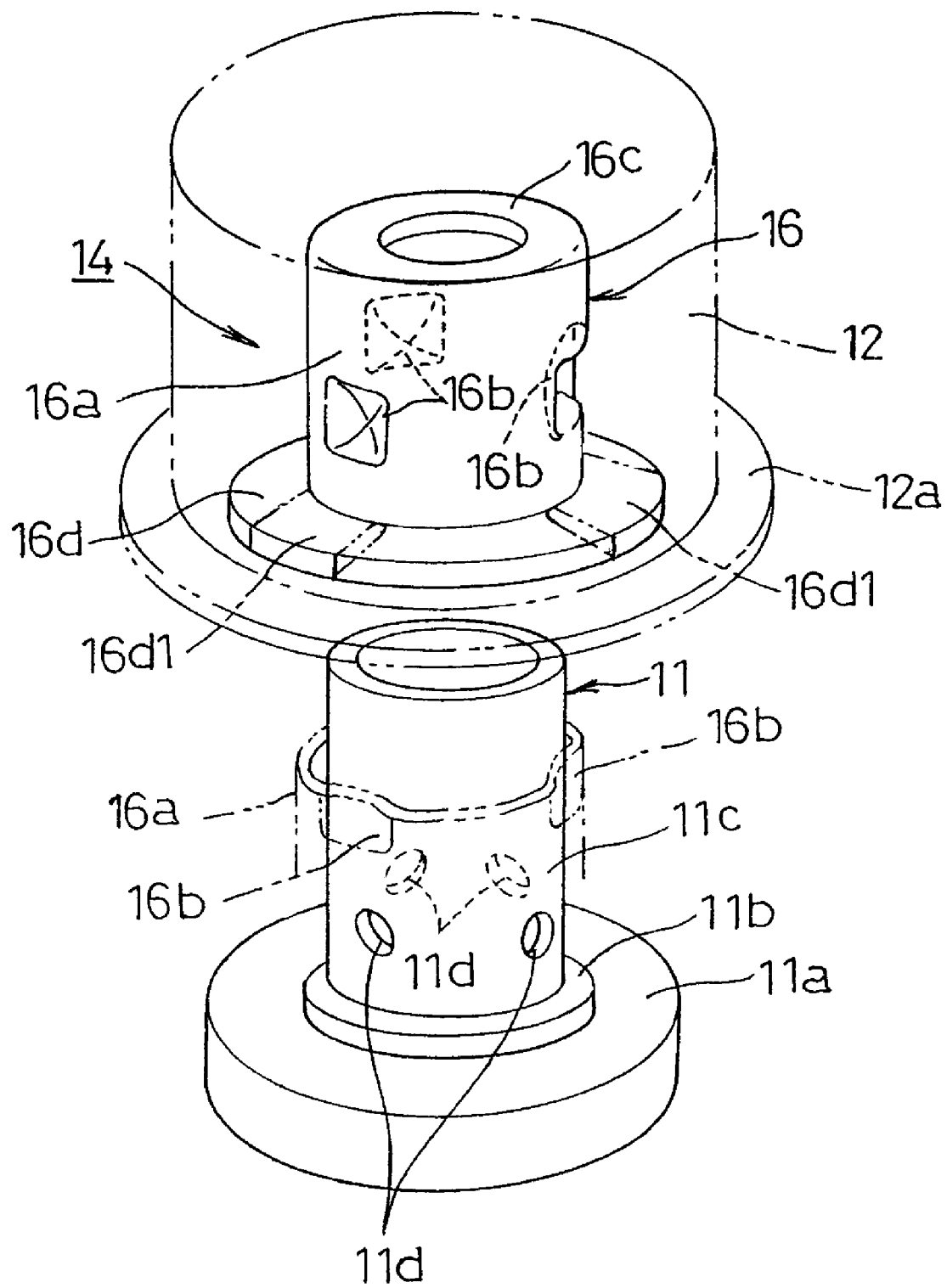
FIG. 4 is an exploded perspective view showing the supporting structure shown in FIG. 2.
Figure 5:
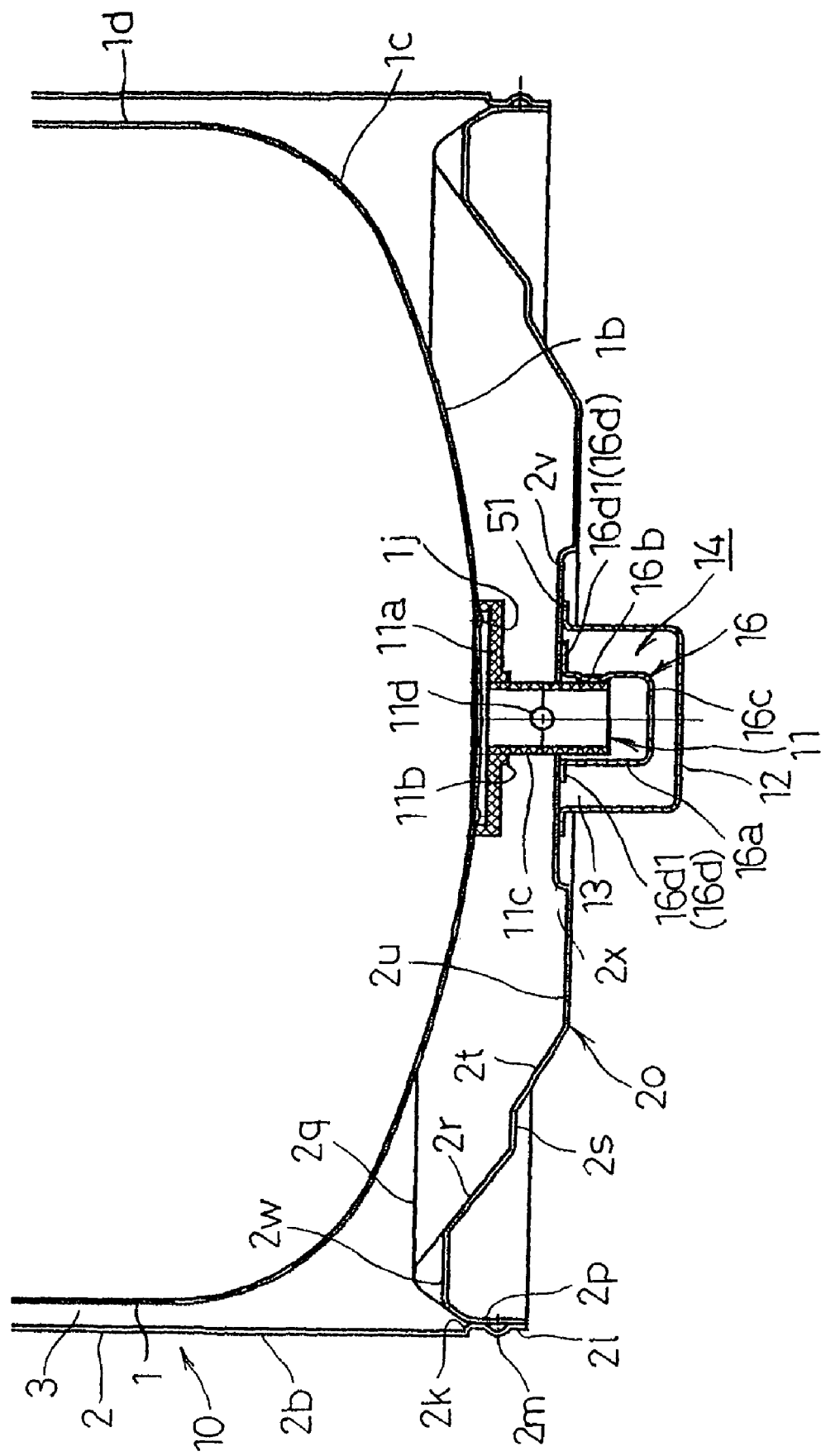
FIG. 5 is a sectional view of a bottom, illustrating another example of the double-layer vacuum container according to the embodiment of the present invention.
Figure 6:
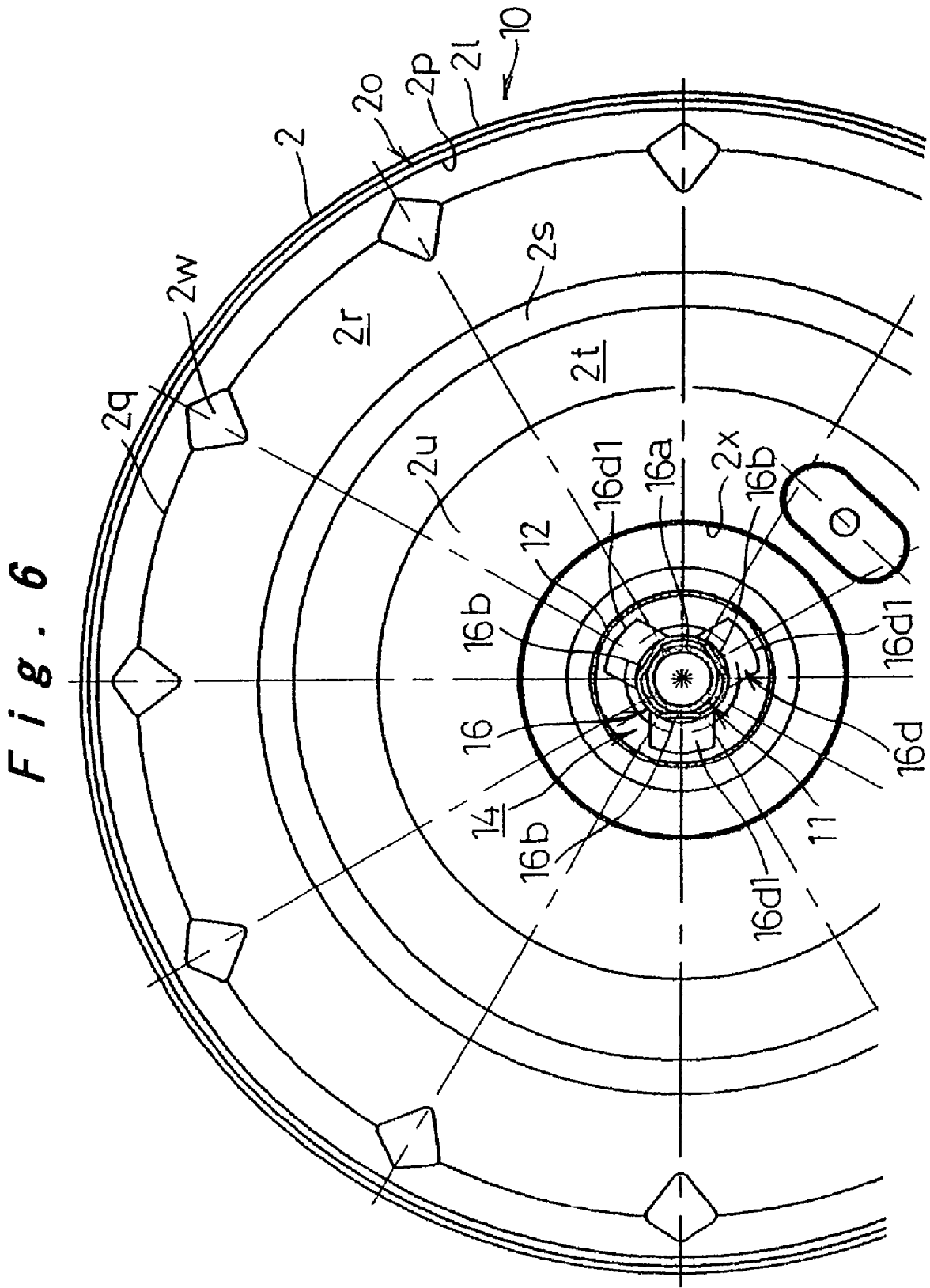
FIG. 6 is a bottom view illustrating the bottom of the double-layer vacuum container shown in FIG. 5.
Figure 8:
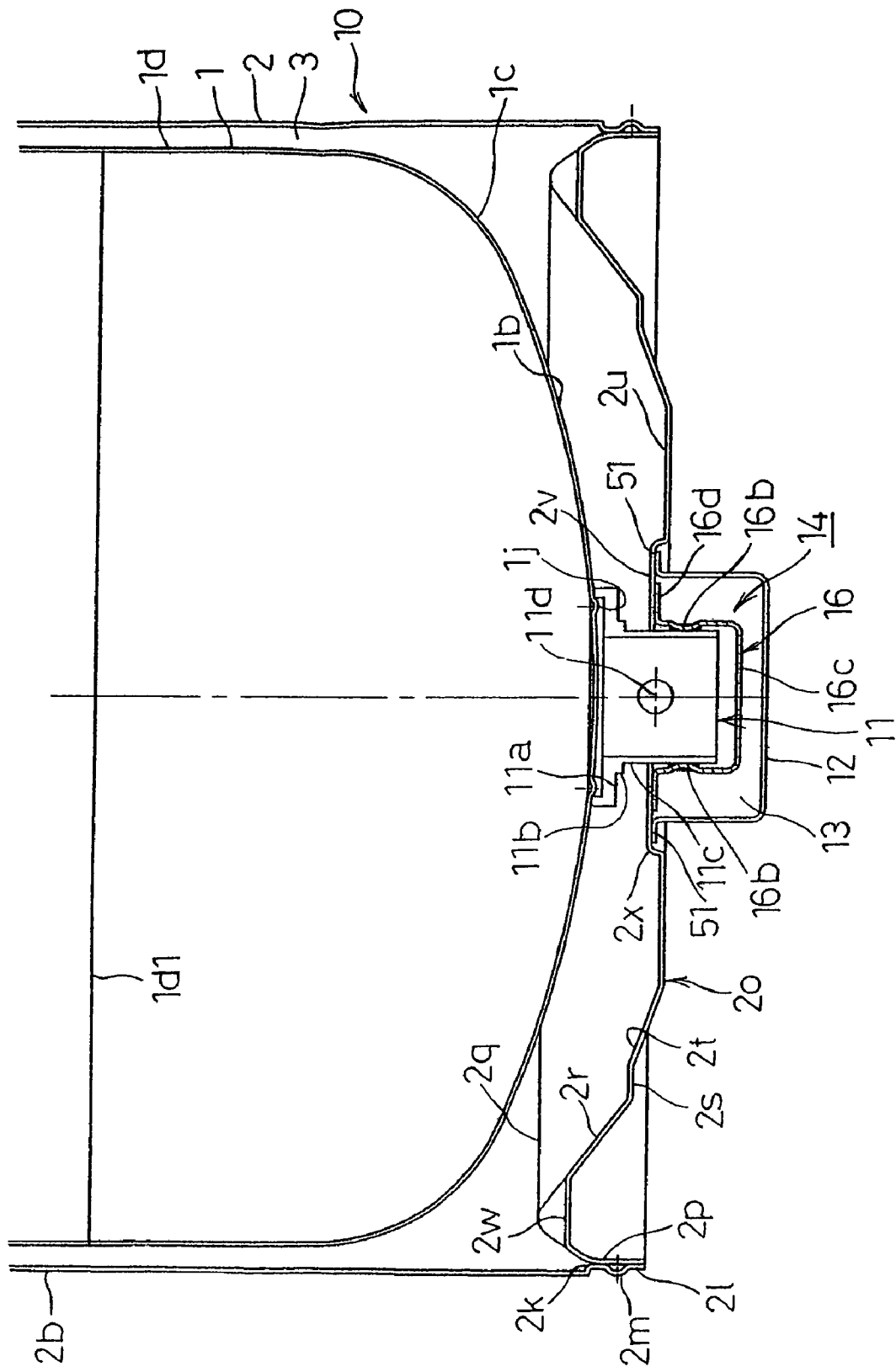
FIG. 8 is a sectional view showing a supporting structure for an inner container with an outer container at the bottom of the double-layer vacuum container shown in FIG. 7.
Figure 9:
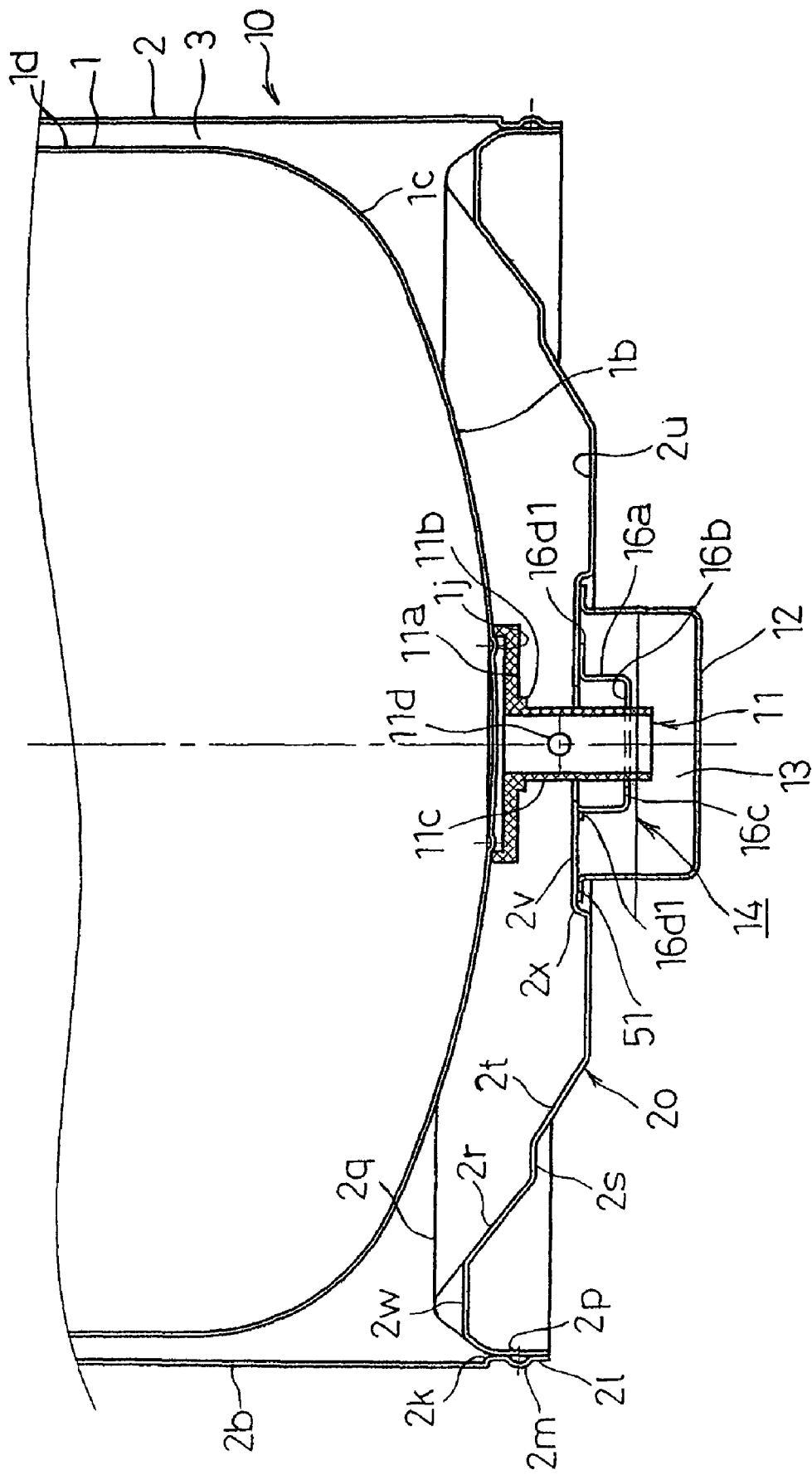
FIG. 9 is a sectional view of a bottom showing a yet another example of the double-layer vacuum container according to the embodiment of the present invention.
Figure 10:
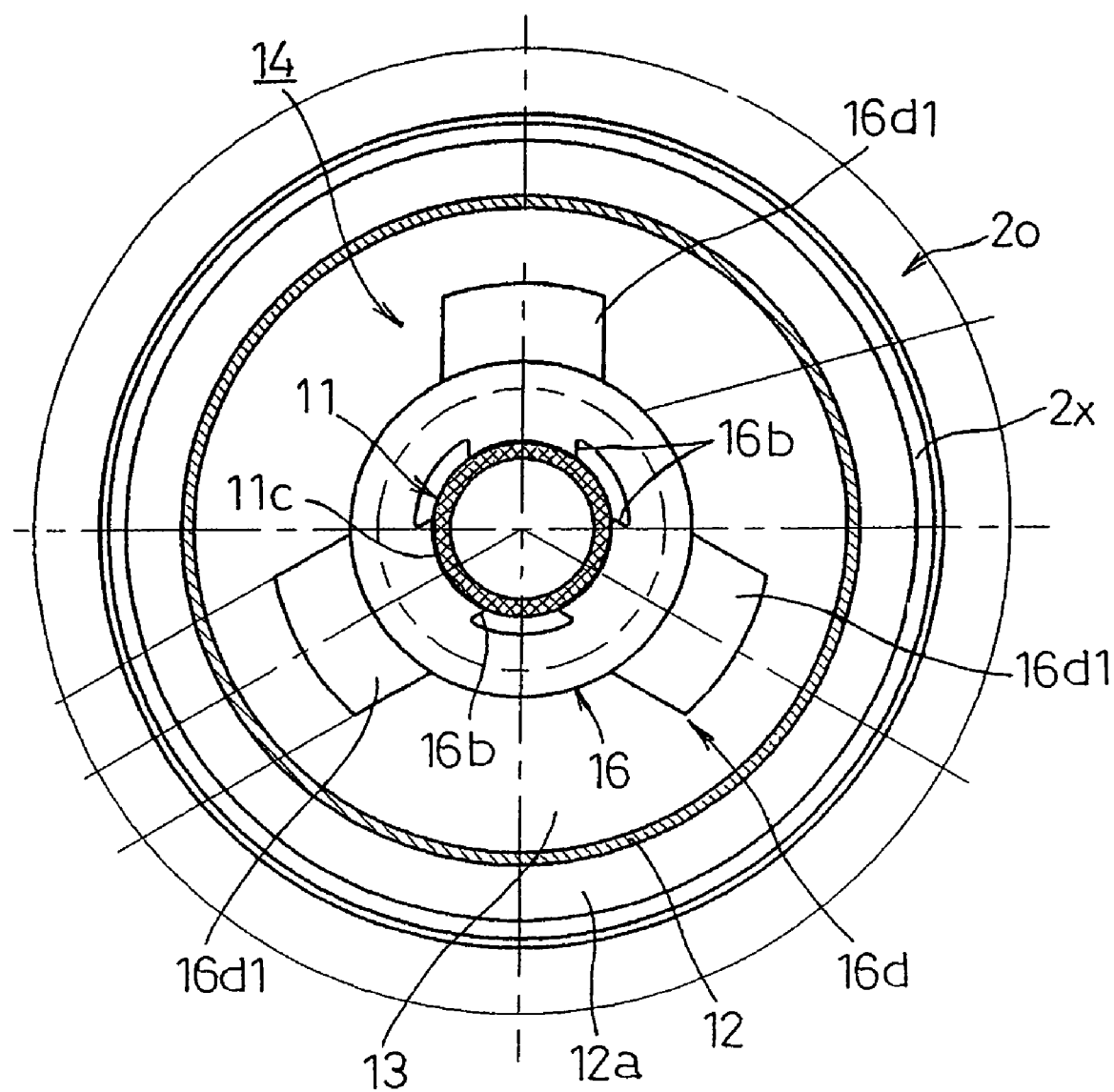
FIG. 10 is a bottom view of a supporting portion for an inner container with an outer container shown in FIG. 9.
Figure 11:
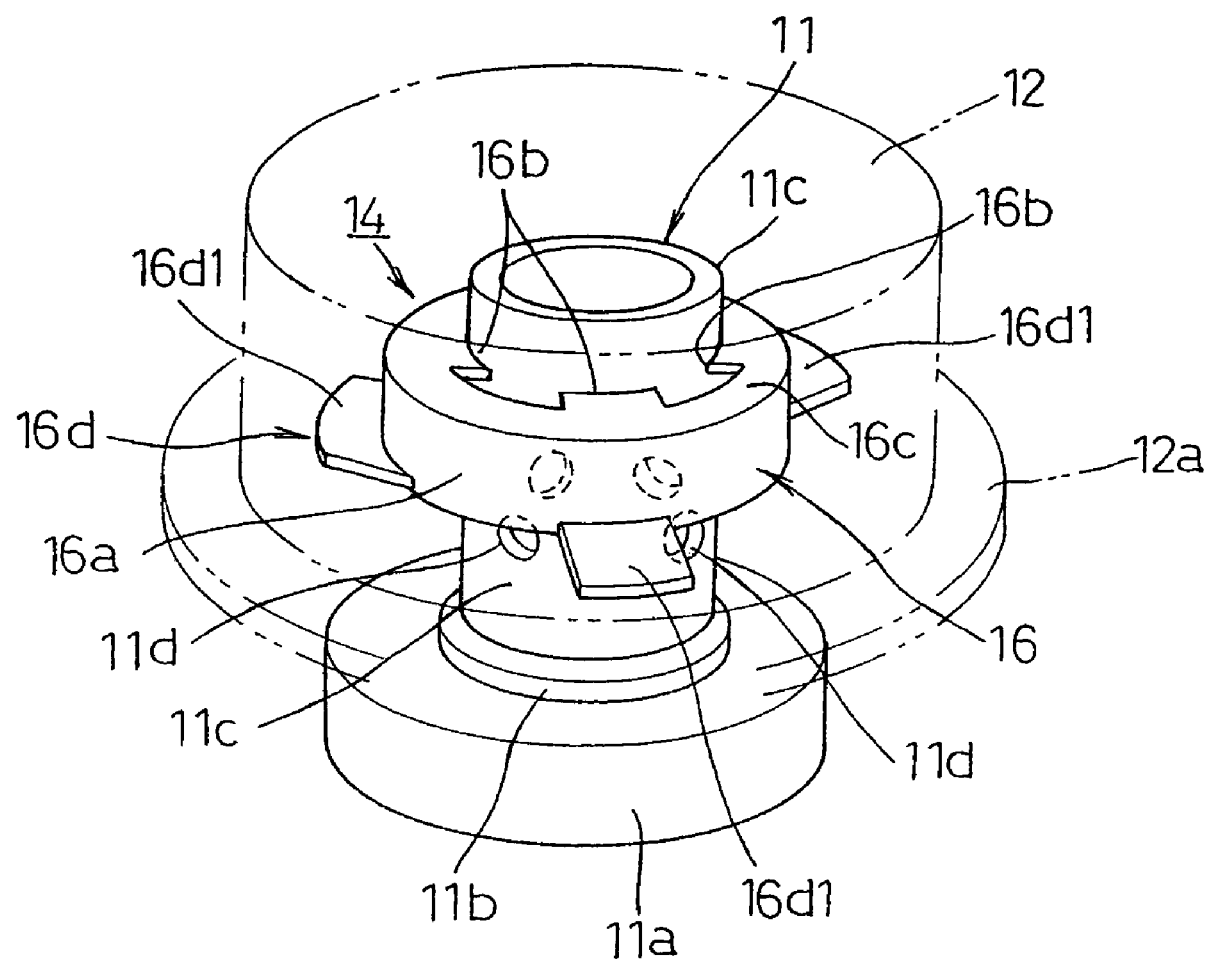
FIG. 11 is a perspective view of the supporting portion shown in FIG. 9.
Figure 12:
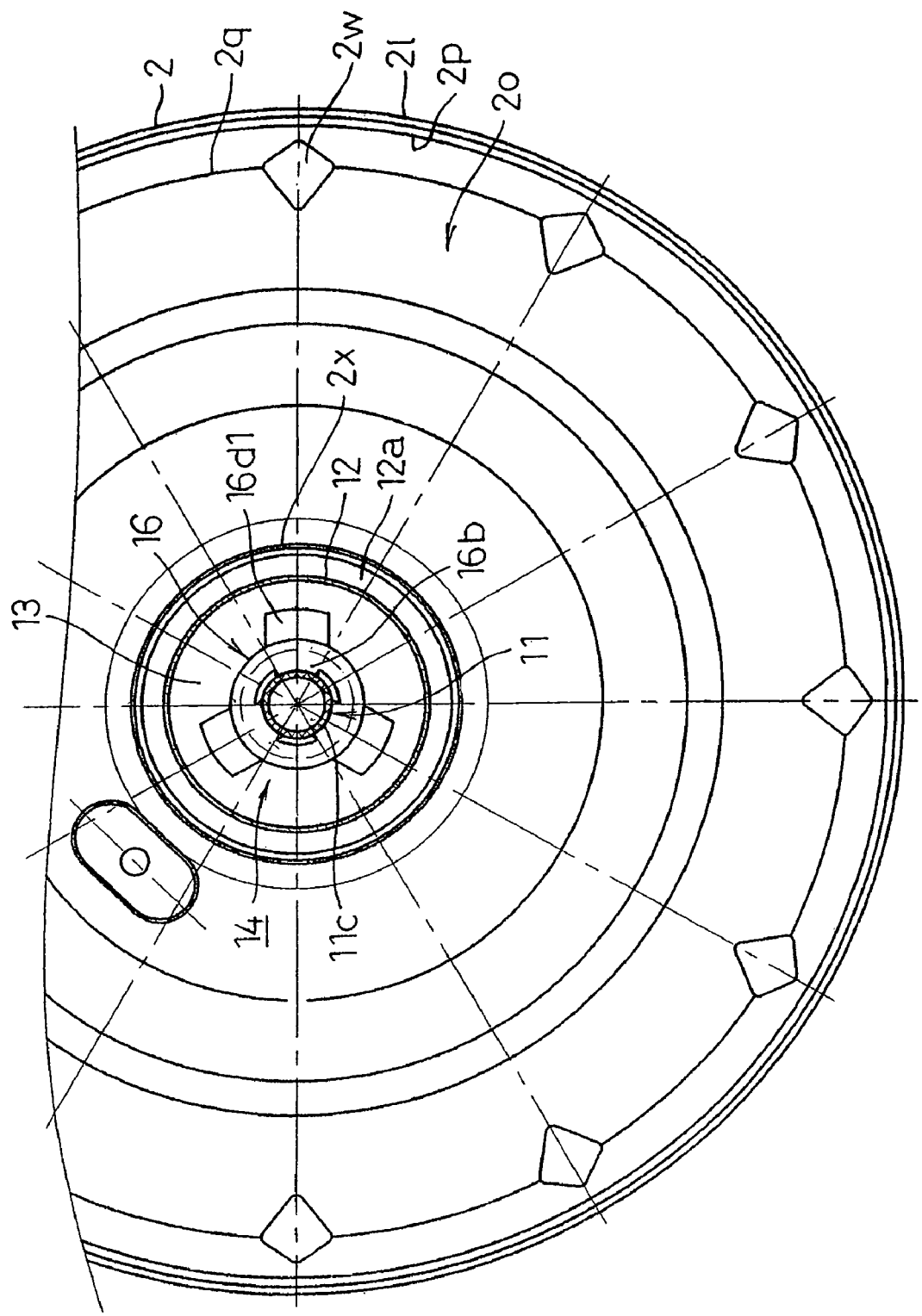
FIG. 12 is a bottom view showing a bottom of the double-layer vacuum container including the supporting portion shown in FIG. 9.
Figure 13:
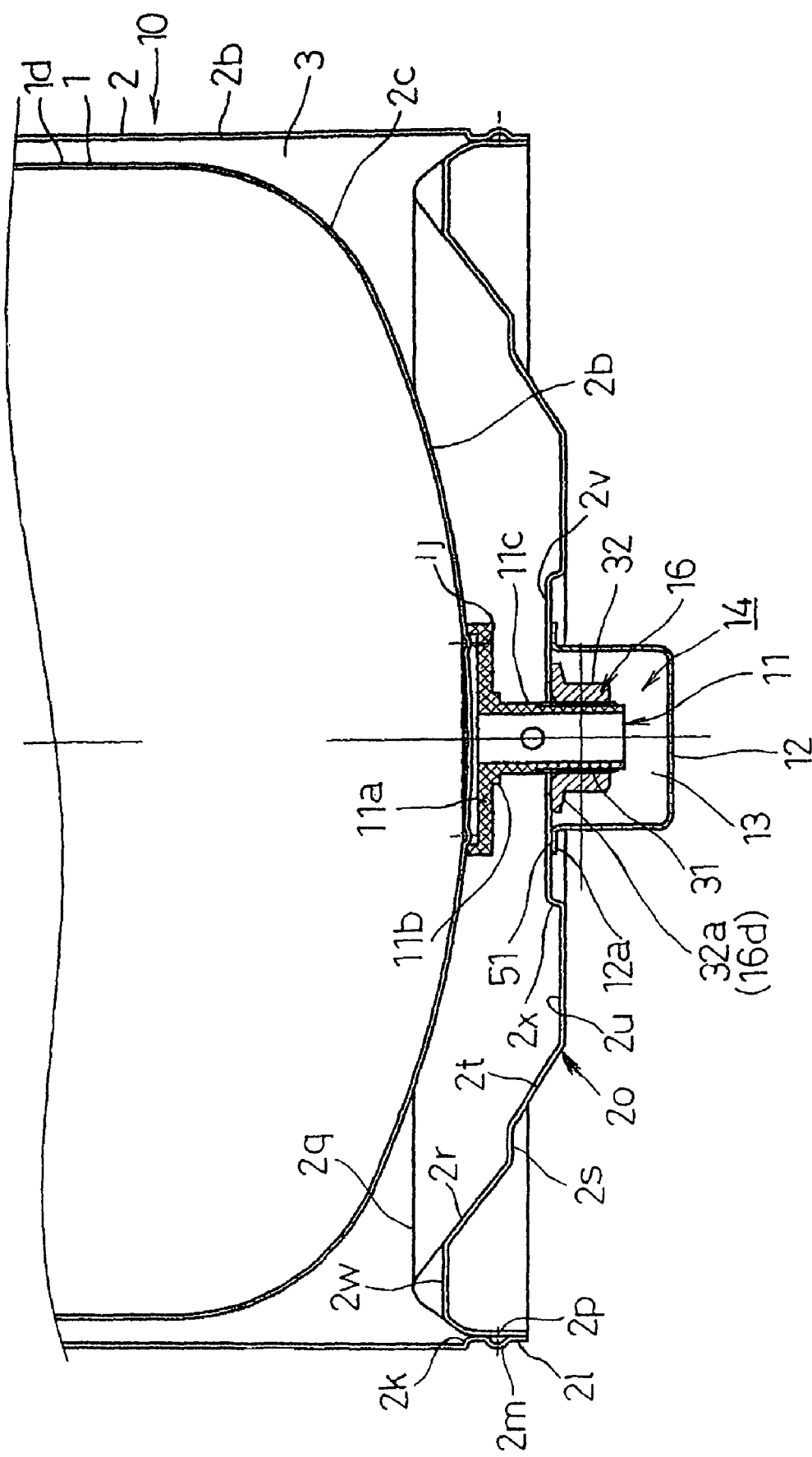
FIG. 13 is a sectional view of a bottom showing a yet further embodiment of a double-layer vacuum container according to the embodiment of the present invention.
Figure 14:
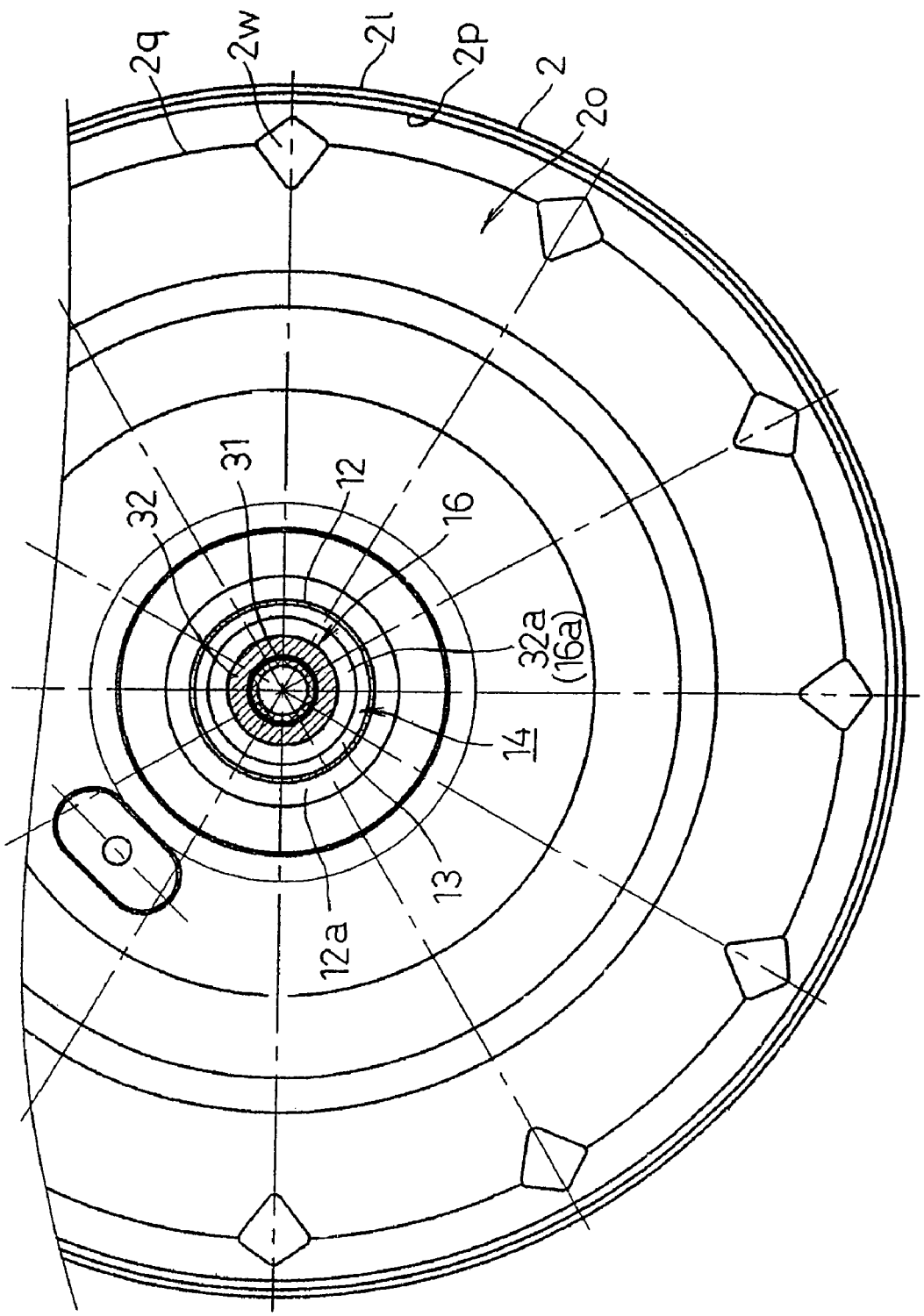
FIG. 14 is a bottom view showing a bottom of the double-layer vacuum container shown in FIG. 13.
Figure 15:
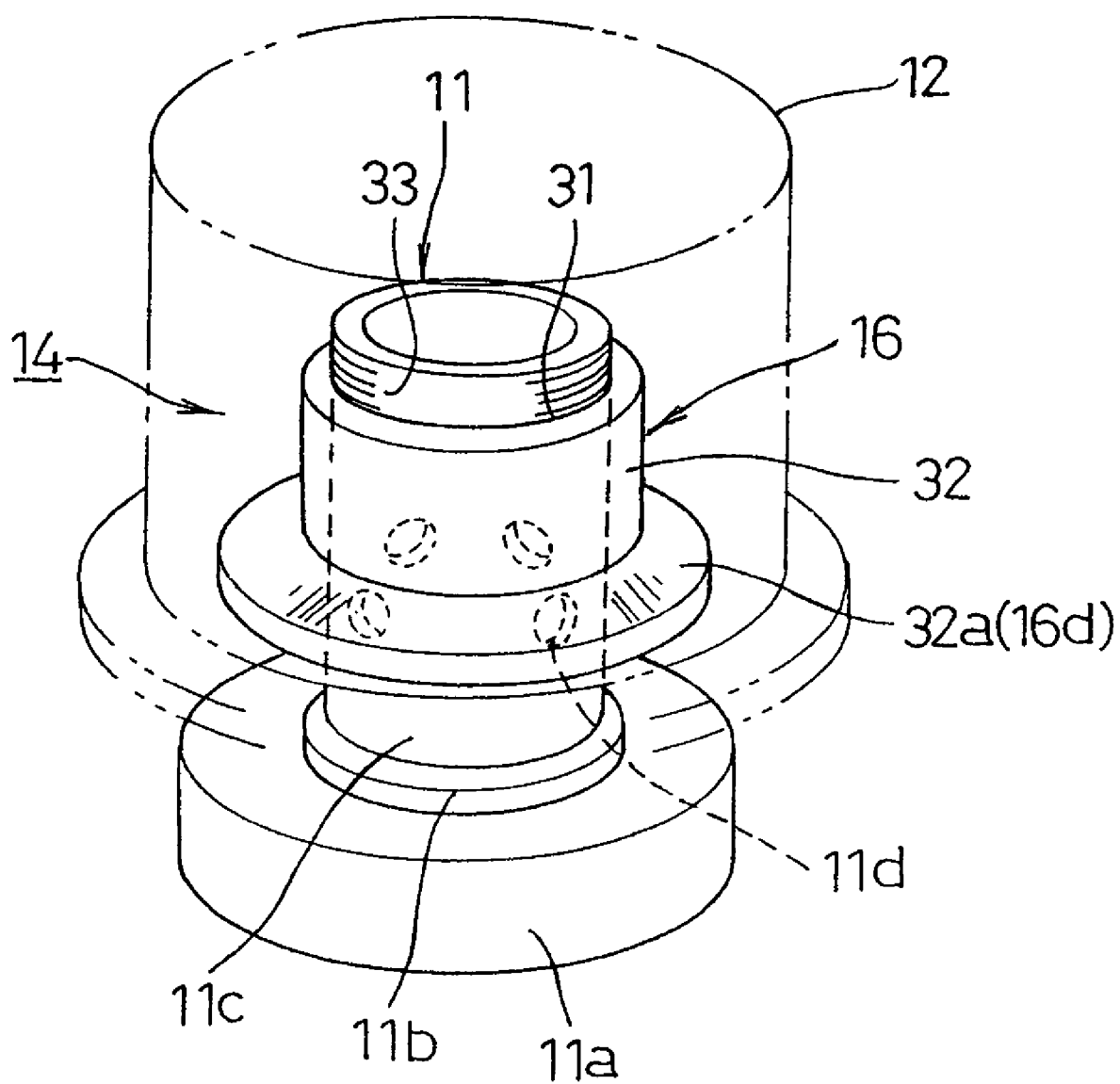
FIG. 15 is a perspective view showing a supporting portion for an inner container with an outer container at the bottom of the double-layer vacuum container shown in FIG. 13.

In particular, in order to provide high vibration proof ability that allows a part of the inner container 1 other than a lip 1a to be supported by the outer container 2 with a good heat retaining property so as to prevent displacement or a damage, the following structure is employed as shown in an example of FIGS. 1 to 4, an example of FIGS. 5 and 6, an example of FIGS. 7 and 8, an example of FIGS. 9 to 12, and an example of FIGS. 13 to 15. The double-layer vacuum container according this embodiment includes: the inner container 1 and the outer container 2 constituting a metal double-layer container 10; the vacuum space 3 formed between the inner container 1 and the outer container 2; and a cover member 12. The inner container 1 includes a bridging member 11 made of a metal material such as stainless steel, which is supported by the outer container 2 in a bridging manner. The outer container 2 supports the bridging member 11 extending from the inner container 1 so as to externally expose the bridging member 11. The cover member 12, which is made of a metal material such as stainless steel, externally covers a portion of the outer container 2 through which the bridging member 11 is exposed and seals a space inside the cover member 12 and a space between the inner container 1 and the outer container 2 in a vacuum state between the cover member and the outer container 2. A supporting portion 14 of the outer container 2 for the bridging member 11 is suitably realized by a supporting member 16 attached to the outer container 2. The bridging member 11 is not necessarily required to project beyond the outer container 2 as shown in the illustrated example described above. If the supporting member 11 does not project beyond the outer container 2, the support member 16 made of a metal material such as stainless steel may alternatively extend into the outer container 2 to support the bridging member 11.

As described above, the inner container 1 is supported by the outer container 2 through the bridging member 11 which extends from the inner container 1 so as to be exposed through the outer container 2 in such a way that a space is covered with the cover member 12 so as to include the portion of the outer container 2 through which the bridging member 11 is exposed. In addition, the portion of the outer container 2 is enclosed within a vacuum space 13 inside the cover member 12, which is simultaneously formed with the attachment of the cover member 12 while sealing the space between the inner container 1 and the outer container 2 in a vacuum state. As a result, heat is prevented from being radiated by the outer container 2 from the inner container 1 through the bridging member 11 and the supporting portion 14 achieved by the outer container 2 to the exterior without needing any special means. At the same time, a heat conduction path from the bridging member 11 through the supporting portion 14 to a portion 15 where the outer container 2 is externally exposed becomes long. The heat radiation due to heat conduction from the inner container 1 through the bridging member 11 via the supporting portion 14 formed by the outer container 2 to the exterior is restrained in accordance with the degree of increase in length of the thermal conduction path. Therefore, the inner container 1 other than the lip 1a is supported by the outer container 2 with a good heat retaining property to prevent any displacement or damages. The lip 1a of the inner container 1 is fitted into the lip 2a of the outer container 2 so as to be subsequently hermetically bonded to each other by TIG welding or the like in such a way that the lip 1a is supported at a bonded portion 17 with the lip 2a of the outer container 2. Since the cover member 12 is separated from the supporting portion 14, heat conduction between the cover member 12 and the supporting portion 14 does not occur. Consequently, external heat radiation due to such heat conduction does not occur.

From another point of view, the double-layer vacuum container according to this embodiment includes the vacuum space 3 formed between the inner container 1 and the outer container 2 constituting the metal double-layer container 10, as in examples respectively shown in FIGS. 1 to 4, FIGS. 5 and 6, FIGS. 7 and 8, FIGS. 9 to 12, and FIGS. 13 to 15. The double-layer vacuum container includes the bridging member 11 extending from the inner container 1 toward the outside of the outer container 2 so as to be supported by the supporting portion 14 of the outer container 2. The cover member 12 is provided so as to cover a portion of the outer container 2 where the bridging member 11 is exposed to be supported by the outer container 2. A space inside the cover member 12 is formed as the vacuum space 13. In this example, the supporting portion 14 for supporting the bridging member 11 of the outer container 2 is suitably a cylindrical wall extending from the outer container 2, including the case where the supporting portion 14 is provided for the outer container 2 itself. Also in this case, the bridging member 11 is not necessarily required to project beyond the outer container 2 as in the above illustrated example. If the bridging member 11 does not project beyond the outer container 2, the supporting portion 14 may alternatively extend into the outer container 2 to support the bridging member 11.

As described above, the inner container 1 is supported by the outer container 2 through the bridging member 11 which extends from the inner container 1 so as to be exposed through the outer container 2. The vacuum space 13 is formed by and covered with the cover member 12 so as to include the portion of the outer container 2 through which the bridging member 11 is externally exposed. In this manner, heat is prevented from being radiated by the outer container 2 from the inner container 1 through the bridging member 11 and the supporting portion 14 to the exterior. At the same time, a length of the heat conduction path from the inner container 1 through the bridging member 11 to the portion where the outer container 2 is externally exposed becomes long. As a result, heat radiation due to thermal conduction from the inner container 1 through the bridging member 11 via the supporting portion 14 by the outer container 2 to the exterior is restrained in accordance with the degree of increase in length of the heat conduction path. Consequently, the inner container 1 other than the lip 1a is supported by the outer container 2 with a good heat retaining property so as to prevent any displacement or damages.

As in the example shown in FIGS. 1 and 7, the inner container 1 has a bottom including: a gentle curve portion 1b in a downwardly convex shape; and an R-portion 1c connecting the curve portion 1b to a body portion 1d in a rounded manner. The body portion 1d is in connection with a shoulder portion 1e which rises in a slightly slant manner with respect to the lip 1a through a rounded R-portion 1f. The lip 1a has a straight rising shape from the shoulder 1e through a small rounded R-portion 1g. With such a structure, the inner container 1 is excellent in a vibration-proof property.

Moreover, an increased-diameter portion 1i having an increased diameter is provided with an outwardly upward slant step portion 1h at the upper end of the lip 1a of the inner container 1 so as to achieve the bonding between the inner container 1 and the outer container 2. As a result, the strength when the inner container 1 is supported by the outer container 2 is ensured.

On the other hand, the outer container 2 in the example shown in FIG. 1 has a shoulder portion 2c, which rises at an angle larger than that of the shoulder portion 1e of the inner container 1 from a straight body portion 2b through a small rounded R-portion 2d toward the lip 2a. The lip 2a rises from the shoulder portion 2c through a small rounded R-portion 2e to finally form a straight shape. At the straight portion of the lip 2a, the hermetical bonding with the increased-diameter portion 1i is to be achieved. A plurality of getters 21 are attached on an inner surface of an upper part of the body portion 2b of the outer container 2 so as to draw a vacuum in the vacuum space 3.

The outer container 2 having the above-described structure resists against the displacement of the lip 1a of the inner container 1 in a radial direction as well as toward the bottom side, owing to the inclination of the shoulder portion 2c. On the other hand, for the displacement toward the side opposite to the bottom, the outer container 2 applies a tensile force so as to firmly support the lip 1a of the inner container 1. At the same time, in some cases, the R-portion 2e of the lip 2a demonstrates a vibration-absorbing effect with some elasticity so as to support the lip 1a of the inner container 1 in a radial direction. Therefore, even if the inner container 1 is subjected to vibration or a sudden inertia force from the exterior through the outer container 2, it is possible to prevent the inner container 1 from being displaced or damaged while restraining the occurrence of vibration that may result therefrom.

The outer container 2 in the example shown in FIG. 7 has a shoulder portion 2j. The shoulder portion 2j includes: a slope portion 2g rising upward in a slant manner from an upper end of the straight body portion 2b through a double-step portion 2f toward the lip 2a; and a horizontal portion 2h horizontally extending from the slope portion 2g to the lip 2a in connection with a slant rising portion 2i rising in a slant manner at a nearly vertical angle to the straight portion at the upper end of the lip 2a. The straight upper end of the lip 2a is welded to the increased-diameter portion 1i of the lip 1a of the inner container 1 so as to support the lip 1a of the inner container 1. A reinforcing member 22 in an annular channel shape is welded through an attachment flange 22a integrally formed with the reinforcing member 22 at its edge of a groove so as to be fixedly bonded to the outer surface of the horizontal portion 2h of the shoulder portion 2j. A plurality of getters 21 are provided on the inner surface of the horizontal portion 2h.

The outer container 2 having the above-described structure firmly supports the lip 1a of the inner container 1 in a radial direction by the double-step portion 2f, the slope portion 2g, and the horizontal portion 2h. With the help of the reinforcing member 22, the outer container 2 also firmly supports the lip 1a of the inner container 1 in a thrust direction. Simultaneously, the slant rising portion 2i demonstrates a vibration-absorbing effect with some elasticity in supporting the lip 1a of the inner container 1 in a radial direction. Therefore, even if the inner container 1 is subjected to vibration or a sudden inertia force from the exterior through the outer container 2, it is possible to prevent the inner container 1 from being displaced or damaged while restraining the occurrence of vibration that may result therefrom.

In both the outer containers 2 in the examples shown in FIGS. 1 and 7, a bead 2m is formed by sheet metal working so as to outwardly project in the middle of a straight cylindrical portion 2l which downwardly extends from the lower end of the straight body portion 2b through an inward small step 2k. The bead 2m is provided to enhance the rigidity against deformation. A downwardly oriented cylindrical wall 2p formed at the outer circumference of a bottom member 2o is fitted into the cylindrical portion 2l having the bead 2m so that the cylindrical wall 2p and the cylindrical portion 2l are hermetically bonded to each other by TIG welding of the like. The bottom member 2o forms an upward ridge portion 2q at the upper end of the cylindrical portion 2l to have a first slant portion 2r downwardly extending toward the center of the bottom in a slant manner. The bottom member 2o also has: a second slant portion 2t downwardly extending from the first slant portion 2r toward the center in a slant manner through a small horizontal portion 2s; a first horizontal portion 2u horizontally extending from the second slant portion 2t toward the center; and a central horizontal portion 2v inwardly extending from the horizontal portion 2u through a small step portion 2x. At the central horizontal portion 2v, the bridging member 11 downwardly extending from the bottom of the inner container 1 is supported. Moreover, in the ridge portion 2q, a plurality of dents 2w, each having an axis in a radial direction with a V cross-sectional shape, are arranged in a circumferential direction, as shown in FIGS. 6, 12 and 14.

The bottom member 2o having the above-described structure has increased plane rigidity, and therefore is capable of firmly supporting the inner container 1 in a radial direction by the supporting member 14 through the bridging member 11. In this embodiment, in particular, the outer container 2 supports the bridging member 11 around its axis by the supporting member 16 provided inside the cover member 12. The bridging member 11 has a play S formed by a hole 2y about its axis, with the outer container 2.

With such a structure, a length of the heat conduction path in the vacuum spaces 3 and 13 from the bridging member 11 to the outer container 2, therefore, the heat conduction path to the portion 15 where the outer container 2 is externally exposed, is increased as compared with a path through which heat is directly conducted from the bridging member 11 to the outer container 2. Therefore, heat retaining performance is further improved in accordance with the degree of increase in length of the heat conduction path. In addition, the play S posteriorly absorbs a fitting position error of the inner container 1 with respect to the outer container 2 or an attachment position error of the bridging member 11 with respect to the inner container 1 by adjusting the attachment position of the supporting member 16 with respect to the outer container 2. Therefore, a drop in yield, which may otherwise result from the positional error as described above, is prevented.

Figure 2:
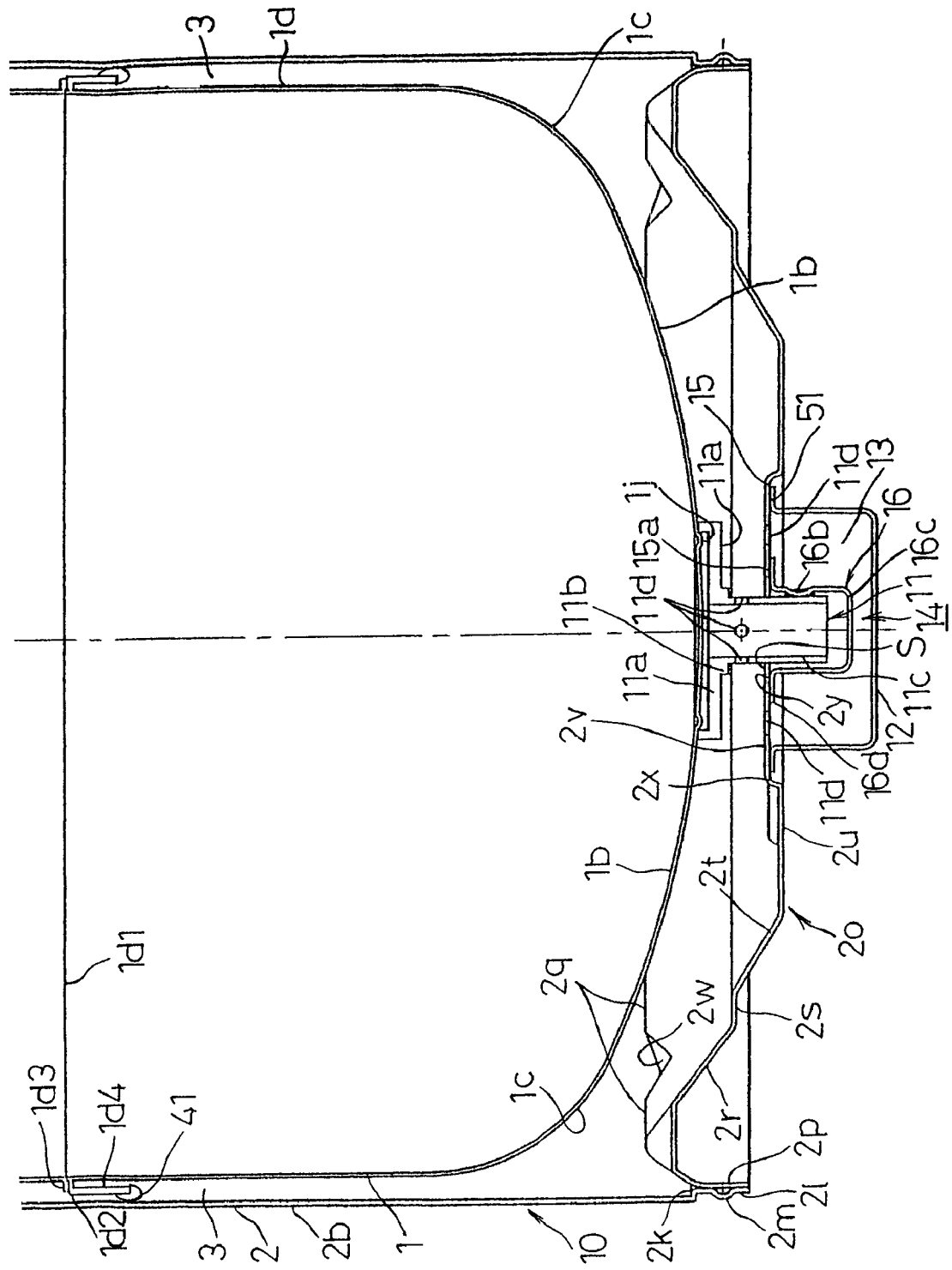
FIG. 2 is a sectional view showing a supporting structure for an inner container with an outer container at the bottom of the double-layer vacuum container shown in FIG. 1.
Figure 3A:
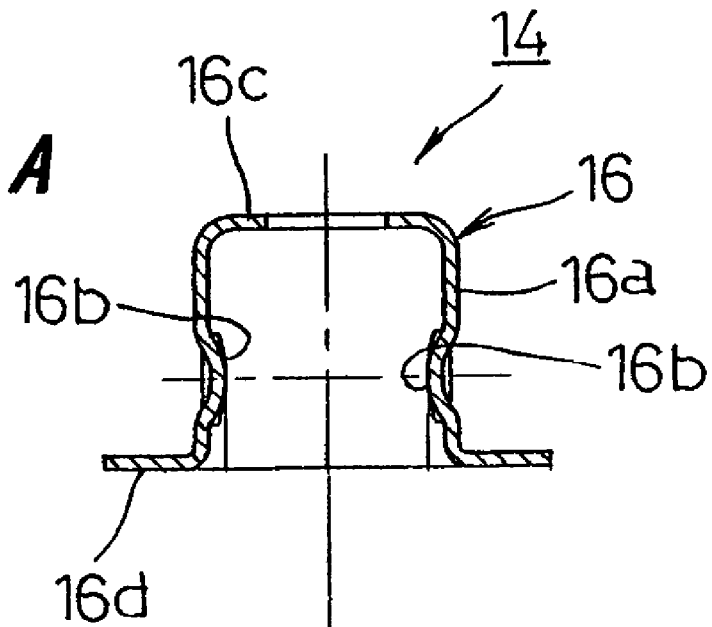
FIG. 3A and FIG. 3B are views, each showing a supporting member in the supporting structure shown in FIG. 2, where
Figure 3B:
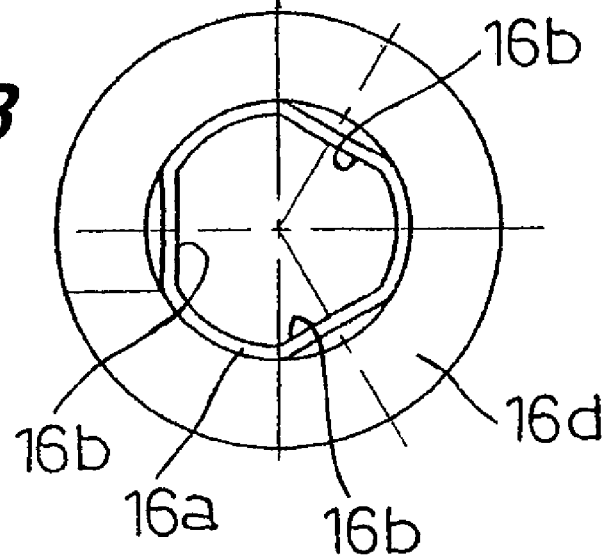

In the example shown in FIGS. 1 and 2, outwardly oriented bonding flanges 1d2 and 1d3 as shown in FIG. 2 are formed at a joint portion 1d1 formed by welding the body portion 1d of the inner container 1. A cylindrical wall 1d4, which is substantially parallel to the body portion 1d, is provided for one flange 1d2. A spacer 41 is provided at the tip of the cylindrical wall 1d4. The spacer 41 is made of a ceramic or the like having a heat insulating property and a heat resistance that is high enough to resist a temperature at the vacuum pumping. The spacer 41 contacts the inner side of the body portion 2b of the outer container 2 so as to inwardly support the body portion 2b of the outer container 2. At the same time, with these flanges 1d2 and 1d3, the body portion 1d of the inner container 1 is supported by the body portion 2b of the outer container 2 so as to further facilitate the prevention of the vibration or displacement of the inner container 1.

In the respective examples shown in FIGS. 1 to 4, FIGS. 5 and 6, FIGS. 7 and 8, the bridging member 11 is supported by, for example, three or more convex portions 16b which provided by plate working on a circular cylindrical wall 16, on which the bridging member 11 is fitted into the supporting member 16a, in a circumferential direction. Each of the convex portions 16b is curved in an inwardly convex manner from an approximately rectangular contour portion toward a central portion, for example, as shown in FIGS. 3A, 3B and FIG. 4. However, the convex portion 16b may basically have any degree of curvature and shape as long as it partially contacts the cylindrical wall 16a of the supporting member 16, in particular, in line contact or point contact. In addition, since the convex portion 16b projects from the circular cylindrical wall 16a, the convex portion 16b may inwardly project in a planar manner. In the illustrated example, as shown in FIGS. 3A, 3B and 4, the convex portion 16b is formed so as to have slight curvature in an inward direction.

As described above, the convex portions 16b formed by plate working are capable of stably supporting the bridging member 11 at three or more positions in a circumferential direction as in the examples shown in FIGS. 1 to 4 and FIGS. 5 and 6 even if they are in partial contact such as point contact or line contact with each other. When the number of the convex portions 16b provided in a circumferential direction is increased to four as shown in FIGS. 7 and 8, the supporting strength is improved. Simultaneously, since a contact area between the bridging member 11 and the supporting member 16 is small, the heat conduction therebetween is remarkably restrained to further improve the heat retaining performance. Furthermore, as the degree of inward curvature of the convex portion 16b is reduced, the support demonstrates buffering or vibration-absorbing effects owing to the elastic force. Therefore, the durability of the inner container 1 is further improved. Accordingly, this support is suitably combined with the support having a vibration-absorbing structure achieved by the lip 2a.

In any of the examples shown in FIGS. 1 to 4, FIGS. 5 and 6, and FIGS. 7 and 8, the inwardly oriented flange 16c is provided at the upper end of the cylindrical wall 16a and an attachment seat 16d is fixedly attached to the outer container 2 by welding or the like. As a result, it is ensured that peculiar support for the bridging member 11 around its axis through the convex portions 16b described above is achieved with high rigidity against deformation and, therefore, with high bearing strength. Moreover, since the bridging member 11 includes: the circular attachment seat 11a having a concave portion on its back face, which is fixedly attached to an outer face of the bottom of the inner container 1; and a cylindrical wall 11c extending from the attachment seat 11a through a small bulging step 11b. The outer face of the cylindrical wall 11c is pressed to be in contact with the convex portions 16b of the supporting member 16 so as to be supported as described above. The cover member 12 is set to have an approximately similar thickness to those of the inner container 1 and the outer container 2, whereas the bridging member 11 has a thickness about 1.5 times as large as those of the inner container 1 and the outer container 2 so as to ensure required strength. The bottom of the inner container 1, to which the bridging member 11 is fixedly attached, has an annular bead 1j that is fitted into the concave portion of the attachment seat 11a. With the bead 1j, the positioning accuracy and the bearing strength for the fixedly attached bridging member 11 are increased. The bridging member 11 and the supporting member 16 is fixedly attached respectively to the inner container 1 and the outer container 2 merely by local build welding at several positions around the attachment seats 11a and 16d, for example, at three or more positions.

A plurality of heat conduction inhibition holes 11d are provided in the middle of the cylindrical wall 11c of the bridging member 11. As a result, a width of the middle part of the heat conduction path for conducting heat from the inner container 1 through the bridging member 11 to the outer container 2 is reduced to restrain the heat radiation toward the outer container 2. In this manner, the degradation of a heat retaining property is inhibited from being lowered by the supporting structure achieved by the outer container 2 through the bridging member 11.

Moreover, since the supporting member 16 serves to divert the heat conduction path from the bridging member 11 to the outer container 2 to increase the length of the heat conduction path from the inner container 1 to the outer container 2 in the vacuum spaces 3 and 13, the heat conduction and the heat radiation from the inner container 1 to the portion 15 where the outer container 2 is externally exposed to improve a heat retaining property. Moreover, in the examples shown in FIGS. 1 to 4, FIGS. 7 and 8, the attachment seat 16d of the supporting member 16 is annularly continuous, and therefore, is advantageous in enhancement of the bearing strength of the bridging member 11. On the other hand, in the example shown in FIGS. 5 and 6, the attachment seat 16d is realized in the form of a plurality of, more specifically, three leg portions 16d1. The leg portions 16d1 are respectively fixedly attached by build up welding or the like. The leg portions 16d1 satisfy sufficient bearing strength for the bridging member 11 by their mutual thrusting. At the same time, a contact area between the support member 16 and the outer container 2 is reduced because the attachment seat 16d is not continuous in an annular manner. As a result, a path of the middle of the heat conduction path from the supporting member 16 to the outer container 2 is reduced to restrain the heat conduction from the supporting member 16 to the outer container 2, thereby improving a heat retaining property.

In particular, if each of the leg portions 16d1 of the supporting member 16 is formed by using its bending margin so that the supporting member 16 is separated from the outer container 2 by, for example, about a thickness of the supporting member 16, as indicated with a imaginary line in FIG. 4, some elasticity is provided for the support by the supporting member 16, which is obtained by mutual thrusting between the leg portions 16d1. Therefore, the support for the inner container 1 through the bridging member 11 is provided with buffering and vibration-absorbing properties to further enhance the durability of the inner container 1.

In the example shown in FIGS. 9 to 12, the supporting member 16 including the flange 16c provided at the upper end and the attachment seat 16d with three leg portions 16d1 is employed. In this structure, the convex portions 16b supporting the bridging member 11 on its circumference are formed as a plurality of, specifically, three or more projecting pieces projecting from the inner circumferential edge of the flange 16c. The support for the bridging member 11 with the convex portions 16b is reinforced by the thrusting of the projecting convex portions 16b. The vibration absorbing property and the buffering property are obtained at the three leg portions 16d1. It is apparent that the vibration absorbing property and the buffering property are obtained in accordance with the degree of inclination of the projecting convex portions 16b from its horizontal position.

In the example shown in FIGS. 13 to 15, the supporting member 16 supports the bridging member 11 with a screw fitting portion 31 into which the bridging member 11 is fitted. An existing flange nut 32 is used as the supporting member 16. A flange portion 32a serves as the attachment seat 16d. The outer circumferential portion of the flange portion 32a is fixedly attached to the outer container 2 at a plurality of positions, for example, three positions, by build up welding or the like. For such support, the screw 33 is formed on outer circumference of the bridging member 11 at the tip. After formation of the double-layer container 10, the flange nut 32 is fitted into the screw 33 of the bridging member 11 projecting from a hole 2y of the outer container 2 regardless of whether the bridging member 11 is eccentric to the hole 2y or not. Then, the flange portion 32a is fixedly attached to the outer container 2 in a moderately tightened manner by welding or the like while the bottom of the inner container 1 is being moved toward the bottom of the outer container 2. In this way, the inner container 1 is firmly supported while being pulled toward the outer container 2 so as not to displace the axis, thereby facilitating the prevention of displacement or damages of the inner container 1. As a result, the durability is further enhanced.

As described above, in the structure in which the supporting member 16 is provided as a member attached after the formation of the double-layer container 10, even if a variation occurs in the fitting position of the inner container 1 with respect to the outer container 2 or in the attachment position of the bridging member 11 with respect to the inner container 1, the supporting member 16 is attached to the outer container 2 while supporting the bridging member 11 so that it is ensured that the above-described variation in positioning is easily absorbed.

When the heat conduction inhibition holes 11d are provided in the middle of the heat conduction path of the member constituting the heat conduction path from the inner container 1 to the portion 15 where the outer container 2 is externally exposed, the heat conduction inhibition holes 11d provided in the member constituting the heat conduction path serve to partially reduce a width of the heat conduction path so as to inhibit the heat conduction ahead of them, as described above, although the heat may be otherwise conducted from the inner container 1 to the portion 15 where the outer container 2 is externally exposed so as to be externally radiated. With such a structure, a heat retaining property is further improved. Therefore, such heat conduction inhibition holes 11d may be provided at any position in the heat conduction path; for example, they are effectively provided between the portion 15a of the outer container 2, to which the supporting member 16 is fixedly attached, and the exposed portion 15.

Finally, as an example, the cover member 12 is in a circular cap form having an annular attachment seat 12a serving as an outwardly oriented flange on its opening, as in the examples shown in FIGS. 1 to 4, FIGS. 5 and 6, FIGS. 7 and 8, FIGS. 9 to 12, and FIGS. 13 to 15. The attachment seat 12a is placed on the outer circumference of the central horizontal portion 2v inside the step 2x provided for the bottom member 2o of the outer container 2. Through the attachment seat 12a, the space between the inner container 1 and the outer container 2 and the space inside the cover member 12 are sealed in a vacuum state. Such vacuum pumping and sealing are achieved, for example, in the following manner. The attachment seat 12a of the cover member 12 is placed through a sealing material such as a brazing metal or a glass seal so as to leave a vacuum-pumping path with the central horizontal portion 2v being upwardly oriented. In this state, the spaces are pumped to a vacuum in a vacuum-pump furnace. A vacuum area in the vacuum-pump furnace extends to the space inside the cover member 12 and the space between the inner container 1 and the outer container 2 through the vacuum-pumping path between the attachment seat 12a and the central horizontal portion 2v, inside the cover member 12, between the supporting member 16 and the bridging member 12, and the hole 2y. With the aid of a heating environment, the whole area of the inner space from the inside of the cover member 12 to the space between the inner container 1 and the outer container 2 reaches a predetermined degree of vacuum. Simultaneously, the sealing material is molten at the boundary between the central horizontal portion 2v and the cover member 12 by heating with the atmosphere so as to extend between the central horizontal portion 2v and the cover member 12 owing to its own wetting property. Thereafter, the sealing material is cooled to be solidified, thereby forming a sealing portion 51 for sealing the vacuum spaces 3 and 13 at the boundary. A sealing structure is not limited thereto; various structures may be employed by using various sealing materials.

The getters 21 provided as in the examples shown in FIGS. 1 and 7 are provided on the inner side of the upper body portion or the inner side of the shoulder portion of the outer container 2, which forms a relatively large space, so as to avoid a portion where the inner container 1 and the outer container 2 are close to each other, specifically, between the bottoms with the supporting portion 14 or between the body portions. Even if the inner container 1 and the outer container 2 become closer to each other due to mutual deformation or displacement of the inner container 1 and the outer container, the getters 21 prevent the inner container 1 and the outer container 2 from being in indirect contact with each other in view of preservation of heat retaining performance.

As is apparent from the above description, according to the double-layer vacuum container of the present invention, the inner container is supported by the outer container through the bridging member which extends from the inner container so as to be exposed through the outer container. The exposed portion of the bridging member through the outer container is covered with the cover member. In addition, the exposed portion of the bridging member is enclosed within the vacuum space inside the cover member, which is formed simultaneously with the attachment of the cover member while sealing the space between the inner container and the outer container in a vacuum state. As a result, heat is prevented from being radiated by the outer container from the inner container through the bridging member and the supporting portion to the exterior without needing any special means. At the same time, a length of the heat conduction path from the inner container through the bridging member and the supporting member to the portion where the outer container is externally exposed is increased. Since the heat radiation due to heat conduction from the inner container through the bridging member via the supporting structure achieved by the outer container to the exterior is restrained in accordance with the degree of increase in length of the heat conduction path, the inner container other than its lip is supported by the outer container with a good heat retaining property to prevent any displacement or damages.

In another structure where the outer container supports the bridging member around its axis by the supporting member provided inside the cover member while the bridging member has a play with the outer container about its axis, a length of the heat conduction path in the vacuum space from the bridging member to the outer container, therefore, the heat conduction path to the portion where the outer container is externally exposed, is increased as compared with that of the heat conduction path through which heat is directly conducted from the bridging member to the outer container. Therefore, a heat retaining property is further improved in accordance with the degree of increase in length of the heat conduction path. In addition, a fitting position error of the inner container with respect to the outer container or an attachment position error of the bridging member with respect to the inner container is posteriorly absorbed by adjusting the attachment position of the supporting member with respect to the outer container. Therefore, a drop in yield due to a positional error as described above is prevented.

In a further structure where the inner container and the outer container are bonded at their lips and the bridging member extends from the bottom of the inner container so as to be exposed through the bottom of the outer container to be supported thereby, the inner container is supported by the outer container through the bridging member which extends from the bottom of the inner container to be exposed through the bottom of the outer container in such a manner that the vacuum space is formed by and covered with the cover member so as to include the portion of the outer container through which the bridging member is exposed, thereby preventing heat from being radiated by the outer container from the inner container through the bridging member. At the same time, a length of the heat conduction path to the portion where the outer container is externally exposed is increased. Since the heat radiation due to heat conduction from the inner container through the bridging member via the supporting structure achieved by the outer container to the exterior is restrained in accordance with the degree of increase in length of the heat conduction path, the inner container other than its lip is supported by the outer container with a good heat retaining property to prevent any displacement or damages.

In a further structure where the heat conduction inhibition holes are provided in the middle of the heat conduction path of the member constituting the heat conduction path from the inner container to the portion where the outer container is externally exposed, the heat conduction inhibition holes provided in the member constituting the heat conduction path reduce a width of a part of the heat conduction path so as to inhibit the heat conduction ahead of them, although the heat may otherwise be conducted from the inner container to the portion where the outer container is externally exposed. Therefore, a heat retaining property is further improved.

In a further structure where the bridging member is supported by three or more convex portions formed by sheet metal working on a cylindrical wall, on which the supporting member is fitted to the bridging member, in a circumferential direction, the convex portions formed by sheet metal working stably support the bridging member at three or more positions in a circumferential direction even with a small contact area such as through point contact or line contact while remarkably restraining the heat conduction between the bridging member and the supporting member to further improve the heat retaining performance. In addition, as the degree of curvature of the convex portion is reduced, the support demonstrates higher buffering or vibration-absorbing effects owing to the elastic force. Therefore, the durability of the inner container becomes further increased.

In a further structure where the support member is fixed to the outer face of the outer container through a plurality of leg portions provided in a circumferential direction, the bearing power of the outer container through the supporting member for the inner container is transmitted in an approximately uniformly distributed manner through the plurality of leg portions so as to stably support the inner container. At the same time, the buffering or vibration-absorbing effects owing to the elastic force is demonstrated between the attachment portion having a plurality of leg portions to the outer container and the bridging member, the durability of the inner container becomes further improved.

In a further structure where the bridging member is fitted into the supporting member in a screw structure so as to support the bridging member, the inner container is firmly supported while being pulled toward the outer container without causing any displacement of the axis. Therefore, the displacement or damage of the inner container is more easily prevented, thereby further improving the durability.

According to another double-layer vacuum container of the present invention, the inner container is supported by the outer container through the bridging member which extends from the inner container so as to be exposed through the outer container. A space is covered with the cover member so as to include the portion of the outer container through which the bridging member is exposed. In addition, the portion of the outer container through which the bridging member is exposed is enclosed within the vacuum space inside the cover member, which is simultaneously formed with the attachment of the cover member while sealing the space between the inner container and the outer container in a vacuum state. As a result, heat radiation by the outer container from the inner container through the bridging member is prevented. At the same time, a length of the heat conduction path to the portion where the outer container is externally exposed is increased. Since the heat radiation due to heat conduction from the inner container through the bridging member via the supporting structure achieved by the outer container to the exterior is restrained in accordance with the degree of increase in length of the heat conduction path, the inner container other than its lip is supported by the outer container with a good heat retaining property to prevent any displacement or damages.

Moreover, according to a further double-layer vacuum container of the present invention, the inner container is supported by the outer container through the bridging member which extends from the inner container so as to be exposed through the outer container. The vacuum space is formed by and covered with the cover member so as to include the portion of the outer container through which the bridging member is exposed in such a manner that heat is prevented from being radiated by the outer container from the inner container through the bridging member. At the same time, a length of the heat conduction path to the portion where the outer container is externally exposed is increased. Since the heat radiation due to heat conduction from the inner container through the bridging member via the supporting structure achieved by the outer container to the exterior is restrained in accordance with the degree of increase in length of the heat conduction path, the inner container other than its lip is supported by the outer container with a good heat retaining property to prevent any displacement or damages.

Furthermore, according to a yet further double-layer vacuum container of the present invention, the inner container is supported by the outer container through the bridging member which extends from the inner container so as to be exposed through the outer container. The vacuum space is formed by and covered with the cover member so as to include the portion of the outer container through which the bridging member is exposed in such a manner that heat is prevented from being radiated by the outer container from the inner container through the bridging member. At the same time, a length of the heat conduction path to the portion where the outer container is externally exposed is increased. Since the heat radiation due to heat conduction from the inner container through the bridging member via the supporting structure achieved by the outer container to the exterior is restrained in accordance with the degree of increase in length of the heat conduction path, the inner container other than its lip is supported by the outer container with a good heat retaining property to prevent any displacement or damages. In particular, since the bridging member is supported by the outer container with the vibration-absorbing portion demonstrating the buffering and vibration-absorbing effects, an impact applied through the outer container or the vibration caused thereby becomes alleviated or damped. Therefore, the inner container becomes easily prevented from being damaged in accordance the buffering and vibration-absorbing effects, thereby improving the durability.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method for manufacturing a double-layer vacuum which includes an outer container and an inner container forming a metal double-layer container, and a vacuum space provided between the inner container and the outer container, the method comprising:

bonding a lip of the inner container to a lip of the outer container, such that the inner container is supported at a bonded portion bonded to the outer container;

supporting the inner container by the outer container by extending a bridging member from the inner container to the outer container externally in a bridging manner;

covering a portion of the outer container through which the bridging member is exposed with a cover member, and providing a sealing material between the cover member and the portion of the outer container so as to leave a vacuum-pumping path through the sealing material;

evacuating a space inside the cover member and a space between the inner container and the outer container through the vacuum-pumping path in a vacuum-pump furnace; and sealing a boundary between the cover member and the outer container with the sealing material so as to close the vacuum-pumping path by flow of the sealing material.

2. The method for manufacturing a double-layer vacuum container according to claim 1, wherein the bridging member is supported by the outer container through a vibration-absorbing portion.

3. The method for manufacturing a double-layer vacuum container according to claim 1, wherein the bridging member is supported around a bridging member axis, by a supporting member provided between the bridging member axis and the outer container, and also provided inside the cover member and attached to the outer container.

4. The method for manufacturing a double-layer container according to claim 3, wherein the bridging member is supported by the supporting member through a vibration-absorbing portion.

5. The method for manufacturing a double-layer vacuum container according to claim 1, wherein the bridging member extends from a bottom of the inner container so as to be exposed through a bottom of the outer container and is supported by the outer container.

* * * * *

UNITED STATES PATENT AND TRADEMARK OFFICE
CERTIFICATE OF CORRECTION

| | | |
|---|---|---|
| PATENT NO. | : 7,797,807 B2 | Page 1 of 1 |
| APPLICATION NO. | : 11/903980 | |
| DATED | : September 21, 2010 | |
| INVENTOR(S) | : Hitoshi Ueda et al. | |

It is certified that error appears in the above-identified patent and that said Letters Patent is hereby corrected as shown below:

The spelling of the name of the first listed inventor should be changed from "Hitoshi Ueda" to -- Hiroshi Ueda --.

Signed and Sealed this
Twenty-eighth Day of December, 2010

David J. Kappos
*Director of the United States Patent and Trademark Office*